US009633161B2

(12) United States Patent
Baek et al.

(10) Patent No.: US 9,633,161 B2
(45) Date of Patent: Apr. 25, 2017

(54) LAYOUT DESIGN SYSTEM, METHOD, AND SEMICONDUCTOR DEVICE EMPLOYING TERMINATION-FREE UNIT DESIGNS

(71) Applicant: Samsung Electronics Co., Ltd., Suwon-si (KR)

(72) Inventors: Sang-Hoon Baek, Seoul (KR); Sang-Kyu Oh, Gwacheon-si (KR); Na-Ya Ha, Seoul (KR); Seung-Weon Paek, Yongin-si (KR); Tae-Joong Song, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 14/474,484

(22) Filed: Sep. 2, 2014

(65) Prior Publication Data

US 2015/0137252 A1    May 21, 2015

(30) Foreign Application Priority Data

Nov. 18, 2013 (KR) ........................ 10-2013-0139844

(51) Int. Cl.
*G06F 17/50* (2006.01)
*H01L 27/02* (2006.01)
*H01L 27/11* (2006.01)
*H01L 27/092* (2006.01)
*H01L 29/66* (2006.01)

(52) U.S. Cl.
CPC ...... *G06F 17/5072* (2013.01); *G06F 17/5068* (2013.01); *H01L 27/0207* (2013.01); *H01L 27/0924* (2013.01); *H01L 27/1104* (2013.01); *H01L 29/6681* (2013.01)

(58) Field of Classification Search
CPC ............. G06F 17/5072; G06F 17/5068; H01L 27/0924; H01L 27/1104; H01L 27/0207; H01L 29/6681
See application file for complete search history.

(56) References Cited

U.S. PATENT DOCUMENTS

| 4,641,279 | A | 2/1987 | Kimura et al. |
| 5,105,385 | A | 4/1992 | Ohtsuka et al. |
| 6,516,457 | B1 * | 2/2003 | Kondou ............. G06F 17/5068 257/202 |
| 6,936,890 | B2 | 8/2005 | Hueting et al. |
| 7,137,092 | B2 * | 11/2006 | Maeda ................ G06F 17/5068 257/E27.107 |
| 7,266,787 | B2 * | 9/2007 | Hughes ............. H01L 27/11807 2/10 |
| 7,290,234 | B2 * | 10/2007 | Shibayama ......... H01L 27/0207 716/119 |
| 7,600,207 | B2 * | 10/2009 | Moroz ................ G06F 17/5068 716/122 |

(Continued)

FOREIGN PATENT DOCUMENTS

| KR | 2005069346 | 7/2005 |
| KR | 2008062727 | 7/2008 |

*Primary Examiner* — Naum B Levin
(74) *Attorney, Agent, or Firm* — Onello & Mello LLP

(57) ABSTRACT

A layout design system includes a processor; a storage unit configured to store a first unit design having a first area, wherein in the first unit design, a termination is not placed on a border thereof; and a design module configured to generate a second unit design having a second area larger than the first area by placing the termination on a border of the first unit.

10 Claims, 22 Drawing Sheets

(56) References Cited

U.S. PATENT DOCUMENTS

| | | | |
|---|---|---|---|
| 7,919,792 B2 * | 4/2011 | Law | H01L 27/0207 257/202 |
| 7,932,566 B2 * | 4/2011 | Hou | G06F 17/5072 257/401 |
| 8,129,095 B2 * | 3/2012 | Grant | G03F 1/144 430/312 |
| 8,249,331 B2 * | 8/2012 | Dodzin | G06T 7/001 382/141 |
| 8,395,224 B2 | 3/2013 | Becker et al. | |
| 8,471,391 B2 | 6/2013 | Fox et al. | |
| 8,572,541 B2 * | 10/2013 | Singh | G06F 17/5072 716/118 |
| 8,621,406 B2 * | 12/2013 | Lei | H01L 27/0207 716/110 |
| 8,719,754 B1 * | 5/2014 | Ginetti | G06F 17/5072 716/119 |
| 8,775,999 B2 * | 7/2014 | Chueh | G06F 17/5072 716/118 |
| 8,863,063 B2 * | 10/2014 | Becker | H01L 27/092 716/118 |
| 8,869,090 B2 * | 10/2014 | Ke | G06F 17/5072 716/122 |
| 8,978,000 B2 * | 3/2015 | Huang | G06F 17/5068 716/111 |
| 9,123,565 B2 * | 9/2015 | Lu | H01L 27/092 |
| 9,147,029 B2 * | 9/2015 | Ke | G06F 17/5072 |
| 2007/0174807 A1 * | 7/2007 | Kumashiro | G03F 7/70441 716/52 |
| 2009/0278569 A1 * | 11/2009 | Taoka | E21B 43/24 326/101 |
| 2010/0164614 A1 * | 7/2010 | Hou | G06F 17/5072 327/565 |
| 2010/0237420 A1 | 9/2010 | Jang | |
| 2011/0195564 A1 | 8/2011 | Liaw et al. | |
| 2012/0060138 A1 * | 3/2012 | Singh | G06F 17/5072 716/120 |
| 2012/0127771 A1 | 5/2012 | Atwal et al. | |
| 2012/0278776 A1 * | 11/2012 | Lei | H01L 27/0207 716/111 |
| 2012/0278781 A1 | 11/2012 | Wann et al. | |
| 2012/0292712 A1 | 11/2012 | Baek et al. | |
| 2013/0164934 A1 | 6/2013 | Yanagidaira et al. | |
| 2013/0171809 A1 | 7/2013 | Lee et al. | |
| 2013/0181297 A1 | 7/2013 | Liaw | |
| 2014/0097493 A1 * | 4/2014 | Baek | H01L 27/1211 257/347 |
| 2014/0282325 A1 * | 9/2014 | Chen | G06F 17/5081 716/111 |
| 2015/0064869 A1 * | 3/2015 | Hong | H01L 21/823821 438/283 |
| 2016/0055285 A1 * | 2/2016 | Baek | G06F 17/5072 716/122 |

\* cited by examiner

1200

1300

1400

LAYOUT DESIGN SYSTEM, METHOD, AND SEMICONDUCTOR DEVICE EMPLOYING TERMINATION-FREE UNIT DESIGNS

CROSS-REFERENCE TO RELATED APPLICATION

This application claims priority from Korean Patent Application No. 10-2013-0139844 filed on Nov. 18, 2013 in the Korean Intellectual Property Office, and all the benefits accruing therefrom under 35 U.S.C. 119, the contents of which in its entirety are herein incorporated by reference.

TECHNICAL FIELD

The exemplary embodiments in accordance with principles of inventive concepts relate to a layout design system, a layout design method, and a semiconductor device fabricated by using the same.

BACKGROUND

For years electronic devices have provided increased performance and integration in more compact packages and the trend continues to this day. Methods and apparatuses to address the needs of integration, performance, and miniaturization continue to be in demand.

SUMMARY

In exemplary embodiments in accordance with principles of inventive concepts, a layout design system includes a processor; a storage unit configured to store a first unit design having a first area, wherein in the first unit design, a termination is not placed on a border thereof; and a design module configured to generate a second unit design having a second area larger than the first area by placing the termination on a border of the first unit design by using the processor.

In exemplary embodiments in accordance with principles of inventive concepts, the first unit design includes a cell level or macro level design, and the second unit design includes a block level or chip level design.

In exemplary embodiments in accordance with principles of inventive concepts, the termination includes at least one of a dummy gate electrode and a dummy active fin.

In exemplary embodiments in accordance with principles of inventive concepts, the termination includes a first termination including the dummy gate electrode and a second termination including the dummy active fin, the first termination is placed to extend in a first direction along the border of the first unit design, and the second termination is placed to extend in a second direction crossing the first direction along the border of the first unit design.

In exemplary embodiments in accordance with principles of inventive concepts, the first termination includes the plurality of dummy gate electrodes, and the second termination includes the plurality of dummy active fins.

In exemplary embodiments in accordance with principles of inventive concepts, the design module includes: a layout module configured to place the first unit design within a boundary of the second unit design; an outline setting module configured to set an outline on the border of the placed first unit design; and a termination generation module configured to generate the termination within the set outline.

In exemplary embodiments in accordance with principles of inventive concepts, the outline defines a halo area.

In exemplary embodiments in accordance with principles of inventive concepts, the design module is stored in the storage unit or in another storage unit separated from the storage unit.

In exemplary embodiments in accordance with principles of inventive concepts, the first unit design includes an inverter design, and the second unit design includes a logic block design.

In exemplary embodiments in accordance with principles of inventive concepts, the first unit design includes a memory cell design, and the second unit design includes a memory cell array design.

In exemplary embodiments in accordance with principles of inventive concepts, a layout design method in a layout design system that generates a second unit design having a larger area than a plurality of first unit designs by receiving the plurality of first unit designs by using a processor and a storage unit, includes receiving the plurality of first unit designs; placing the plurality of first unit designs; and generating the second unit design by generating a first termination on a border of the plurality of first unit designs.

In exemplary embodiments in accordance with principles of inventive concepts, the first termination is not placed on the border of each first unit design.

In exemplary embodiments in accordance with principles of inventive concepts, the first termination includes at least one of a dummy gate electrode and a dummy active fin.

In exemplary embodiments in accordance with principles of inventive concepts, a second termination different from the first termination is placed on the border of each first unit design.

In exemplary embodiments in accordance with principles of inventive concepts, the placing of the plurality of first unit designs includes placing the plurality of first unit designs without considering at least a part of the second termination.

In exemplary embodiments in accordance with principles of inventive concepts, includes defining a halo area after placing the plurality of first unit designs, wherein, in the defining of the halo area, at least a part of the second termination is used as the halo area.

In exemplary embodiments in accordance with principles of inventive concepts, the first unit design includes an inverter design, and the second unit design includes a logic block design.

In exemplary embodiments in accordance with principles of inventive concepts, the first unit design includes a memory cell design, and the second unit design includes a memory cell array design.

In exemplary embodiments in accordance with principles of inventive concepts, a computer readable recording medium has software capable of performing a layout design method in accordance with principles of inventive concepts stored therein.

In exemplary embodiments in accordance with principles of inventive concepts, a semiconductor device includes a first memory cell; and a second memory cell placed adjacent to the first memory cell, wherein each of the first and second memory cells includes an active fin that extends in a first direction, and a gate electrode that extends in a second direction crossing the first direction and is formed on the active fin, at least one of a dummy active fin and a dummy gate electrode is formed at one side of the first memory cell where the first memory cell is not adjacent to the second memory cell, and the dummy active fin and the dummy gate electrode are not formed at the other side of the first memory cell where the first memory cell is adjacent to the second memory cell.

In exemplary embodiments in accordance with principles of inventive concepts, the first and second memory cells include a static random access memory (SRAM) cell.

In exemplary embodiments in accordance with principles of inventive concepts, the dummy gate electrode includes a plurality of dummy gate electrodes that extends in parallel to the second direction, and a width of any one of the plurality of dummy gate electrodes is different from the other width.

In exemplary embodiments in accordance with principles of inventive concepts, the dummy active fin includes a plurality of dummy active fins that extends in parallel to the first direction.

In exemplary embodiments in accordance with principles of inventive concepts, a semiconductor device includes an application processor; and a DRAM, wherein the first and second memory cells are placed in the application processor.

In exemplary embodiments in accordance with principles of inventive concepts, a semiconductor device, includes a plurality of first unit designs; and second unit designs generated by forming a termination on a border of a first unit design.

In exemplary embodiments in accordance with principles of inventive concepts, the termination is a dummy gate electrode or dummy active fin.

In exemplary embodiments in accordance with principles of inventive concepts, the first unit design includes an inverter.

In exemplary embodiments in accordance with principles of inventive concepts, an electronic device includes a semiconductor device, including a plurality of first unit designs; and second unit designs generated by forming a termination on a border of a first unit design.

In exemplary embodiments in accordance with principles of inventive concepts an electronic system includes a semiconductor device, including a plurality of first unit designs; and second unit designs generated by forming a termination on a border of a first unit design.

In exemplary embodiments in accordance with principles of inventive concepts, a smartphone includes a semiconductor device, including a plurality of first unit designs; and second unit designs generated by forming a termination on a border of a first unit design.

In exemplary embodiments in accordance with principles of inventive concepts a system on chip (SoC) includes a semiconductor device, including a plurality of first unit designs; and second unit designs generated by forming a termination on a border of a first unit design.

BRIEF DESCRIPTION OF THE DRAWINGS

The above and other features and advantages of the present invention will become more apparent by describing in detail embodiments thereof with reference to the attached drawings in which.

DETAILED DESCRIPTION

Figure 1:
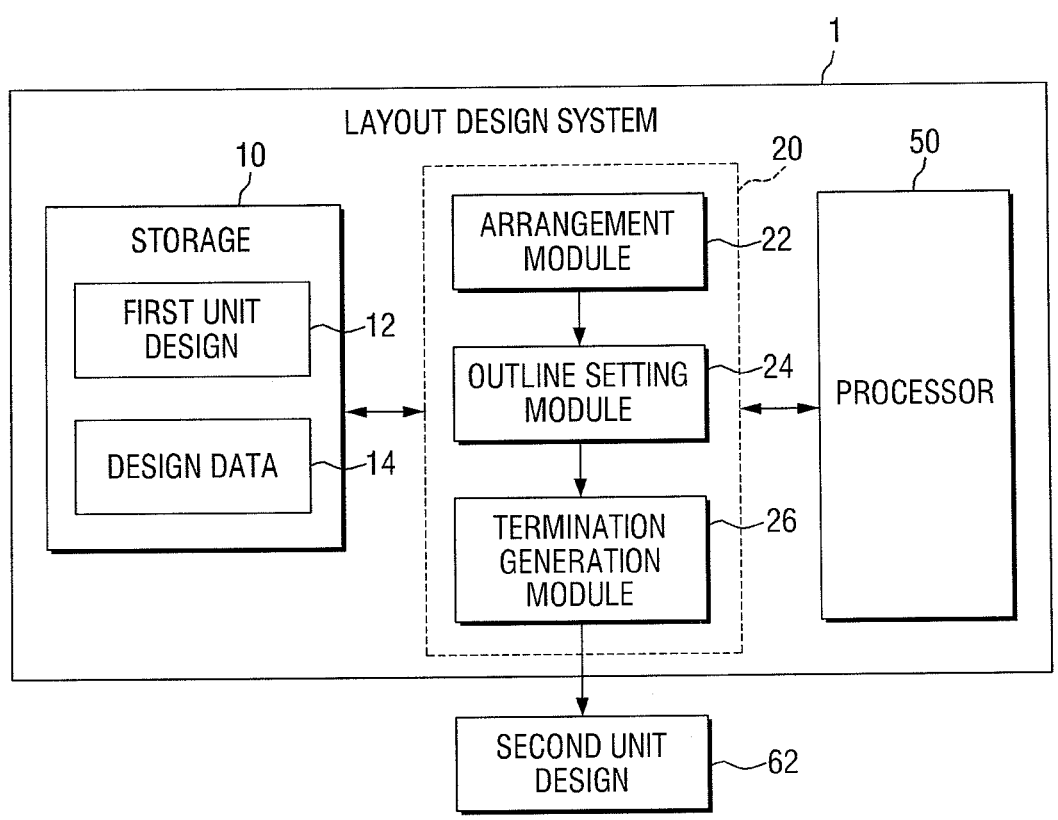
FIG. 1 is a block diagram of a layout design system according to some embodiments of the present invention.

Various exemplary embodiments will be described more fully hereinafter with reference to the accompanying drawings, in which exemplary embodiments are shown. Exemplary embodiments may, however, be embodied in many different forms and should not be construed as limited to exemplary embodiments set forth herein. Rather, these exemplary embodiments are provided so that this disclosure will be thorough, and will convey the scope of exemplary embodiments to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items. The term "or" is used in an inclusive sense unless otherwise indicated.

It will be understood that, although the terms first, second, third, for example. may be used herein to describe various elements, components, regions, layers and/or sections, these elements, components, regions, layers and/or sections should not be limited by these terms. These terms are only used to distinguish one element, component, region, layer or section from another region, layer or section. In this manner, a first element, component, region, layer or section discussed below could be termed a second element, component, region, layer or section without departing from the teachings of exemplary embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. In this manner, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments are described herein with reference to illustrations that are schematic illustrations of idealized exemplary embodiments (and intermediate structures). As such, variations from the shapes of the illustrations as a result, for example, of manufacturing techniques and/or tolerances, are to be expected. In this manner, exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. In this manner, the regions illustrated in the figures are schematic in nature and their shapes are not intended to illustrate the actual shape of a region of a device and are not intended to limit the scope of exemplary embodiments.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The term "unit" or "module", as used herein, may refer to, for example, a software or hardware component, such as a field programmable gate array (FPGA) or an application specific integrated circuit (ASIC), which performs certain tasks. A unit or module may advantageously be configured to reside in an addressable storage medium and may be configured to execute on one or more processors. A unit or module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In exemplary embodiments in accordance with principles of inventive concepts, the functionality provided for in the components and units or modules may be combined into fewer components and units or modules or further separated into additional components and units or modules FIG. 1 is a block diagram of an exemplary embodiment of a layout design system in accordance with principles of inventive concepts. Layout design system 1 includes a storage unit 10, a design module 20, and a processor 50.

A first unit design 12 and design data 14 may be stored in the storage unit 10. In exemplary embodiments in accordance with principles of inventive concepts the term "first unit" may refer to a unit element designed to have a first area. In exemplary embodiments in accordance with principles of inventive concepts, the first unit may be a cell or a macro.

First unit design 12 may be a design in which various integrated circuit components (for example, an active fin and a gate electrode) constituting the first unit are placed. Accordingly, the first unit design 12 may be a cell level design or a macro level design, for example, as will be described in greater detail below.

The design data 14 may be data required for the design module 20 to generate a second unit design 62, which is a higher level than the first unit design 12, by using the first unit design 12. The design data 14 may be stored in the storage unit 10 in a library form, for example.

In exemplary embodiments in accordance with principles of inventive concepts, the storage unit 10 may be configured by, for example, a non-volatile memory device. Examples of the non-volatile memory device may include a NAND flash memory, a NOR flash memory, an MRAM, a PRAM, an RRAM, and the like, however, inventive concepts are not limited thereto. In other exemplary embodiments in accordance with principles of inventive concepts, the storage unit 10 may be implemented with a hard disk drive, a magnetic storage device, and the like.

When a specific calculation is required in the layout design system 1, the processor 50 may serve to perform the specific calculation. Although not illustrated in detail in the drawing, the processor 50 may include cache memories including L1, L2, and the like in order to improve calculation performance.

In FIG. 1, the processor 50 is illustrated as one block, but exemplary embodiments in accordance with principles of inventive concepts are not limited thereto. For example, in some exemplary embodiments in accordance with principles of inventive concepts, the processor 50 may be implemented in a multi-core or multi-cluster form. When the processor 50 is implemented in the multi-core or multi-cluster form, calculation efficiency of the layout design system 1 may be improved.

The design module 20 may generate the second unit design 62 from the first unit design 12 using the processor 50. In exemplary embodiments in accordance with principles of inventive concepts, the term "second unit" may refer to a unit element designed to have a second area that is larger than the aforementioned first area. In exemplary embodiments in accordance with principles of inventive concepts, the second unit may be a functional block or an integrated circuit chip, for example.

In exemplary embodiments in accordance with principles of inventive concepts, the second unit design 62 may be formed by using the design data 14 and the first unit design 12. That is, in exemplary embodiments in accordance with principles of inventive concepts, at least one first unit design 12 may be included according to the design data 14, and as a result, the second unit design 62 may be generated.

The second unit design 62 may be, for example, a functional block level design or an integrated circuit chip level design. In exemplary embodiments in accordance with principles of inventive concepts where the first unit design 12 is a design for the cell, the second unit design 62 may be a design for the macro or the block formed by gathering at least one cell. In exemplary embodiments in accordance with principles of inventive concepts where the first unit design 12 is the design for the macro, the second unit design 62 may be a design for a block or a chip formed by gathering at least one macro.

Although the design module 20 is illustrated separately from the storage unit 10, exemplary embodiments in accordance with principles of inventive concepts are not limited thereto. For example, the design module 20 may be stored in the storage unit 10 in a code form, like the first design data 12. In exemplary embodiments in accordance with principles of inventive concepts, the design module 20 may be separately stored in another storage unit (not illustrated) separated from the storage unit 10 in the code form.

The design module 20 may include a layout module 22, an outline setting module 24, and a termination generation module 26. Although the respective modules are separated from each other as separate blocks and illustrated in FIG. 1, exemplary embodiments in accordance with principles of inventive concepts not limited thereto. Any one module and another module may be integrated with each other to be implemented. That is, in some exemplary embodiments in accordance with principles of inventive concepts, the design module 20 may be implemented by integrating the layout module 22, the outline setting module 24, and the termination generation module 26 into one module and any two modules of the modules may be integrated to be implemented as one module.

In some exemplary embodiments in accordance with principles of inventive concepts, the design module 20 may be implemented in a software form, but inventive concepts are not limited thereto.

The layout module 22 may be a module that places the first unit design 12 within a boundary of the second unit design 62. That is, in exemplary embodiments in accordance with principles of inventive concepts, the layout module 22 may be a module that that determines a layout pattern of the first unit design 12 within the second unit design 62. A more detailed description of such a process in accordance with principles of inventive concepts will be provided below.

The outline setting module 24 may be a module that sets an outline on a border of the first unit design 12 placed within the boundary of the second unit design 62. In exemplary embodiments in accordance with principles of inventive concepts, the outline may be defined as a halo area, that is, an equal-width area surrounding the first unit design 12, but exemplary embodiments in accordance with principles of inventive concepts are not limited thereto. A more detailed description thereof will also be provided below.

The termination generation module 26 may be a module that generates a termination within the outline set by the outline setting module 24. In exemplary embodiments in accordance with principles of inventive concepts, "termination" may refer to other components (for example, a dummy active fin and a dummy gate electrode) for reliably terminating various components (for example, an active fin and a gate electrode) included in the first unit design 12. Hereinafter, as examples of the termination, a dummy gate electrode and a dummy active fin will be described, but exemplary embodiments in accordance with principles of inventive concepts are not limited thereto. A more detailed description thereof will also be provided below.

Hereinafter, referring to FIGS. 2 to 9, an exemplary embodiment of the operation of the layout design system 1 in accordance with principles of inventive concepts will be described in more detail.

Figure 2:
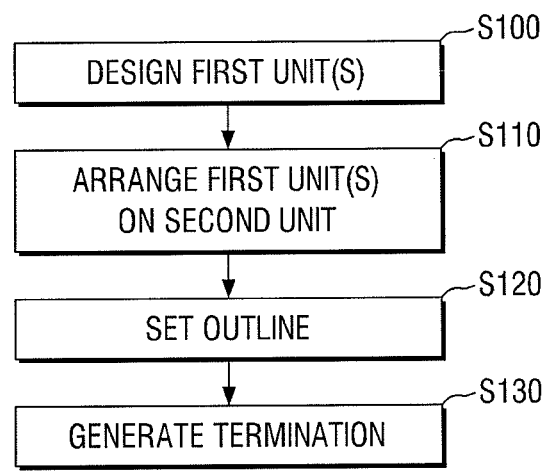
FIG. 2 is a flowchart illustrating a layout design method according to some embodiments of the present invention.

FIG. 2 is a flowchart illustrating a layout design method in accordance with principles of inventive concepts. FIGS. 3 to 9 are diagrams for describing the layout design method illustrated in FIG. 2.

First, referring to FIG. 2, a first unit is designed (S100). In exemplary embodiments in accordance with principles of inventive concepts, when the first unit is designed as described above, the first unit is designed so that the termination is not placed on a border of the first unit, that is, without a termination on the border of the first unit. Hereinafter, referring to FIGS. 3 to 6, a more detailed description thereof will be described.

Figure 3:
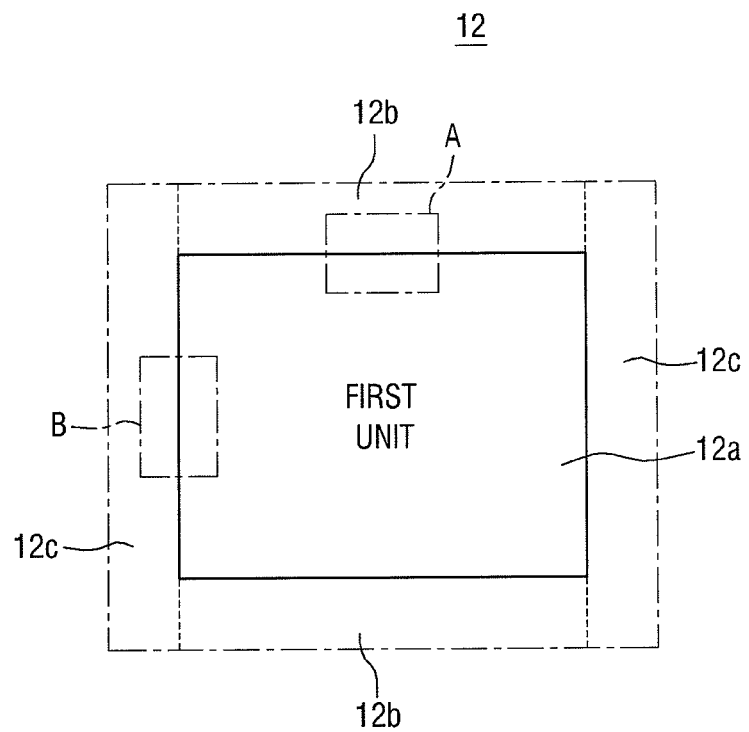
FIGS. 3 to 9 are diagrams for describing the layout design method illustrated in FIG. 2.
Figure 4:
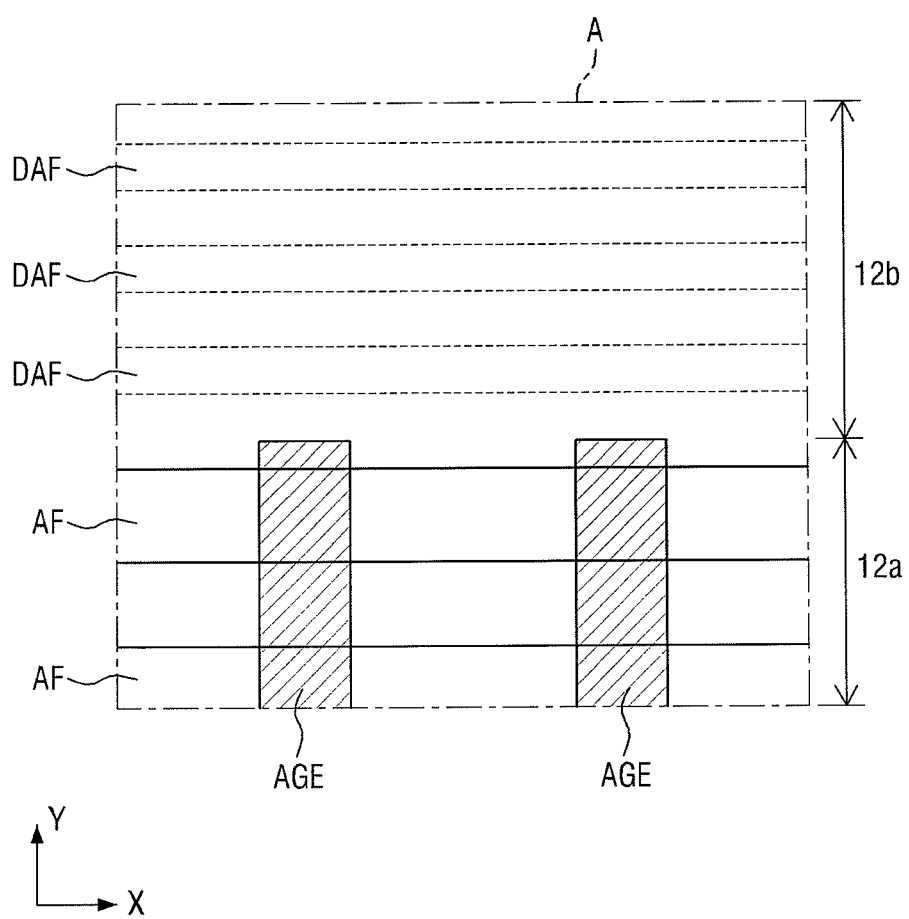
Figure 5:
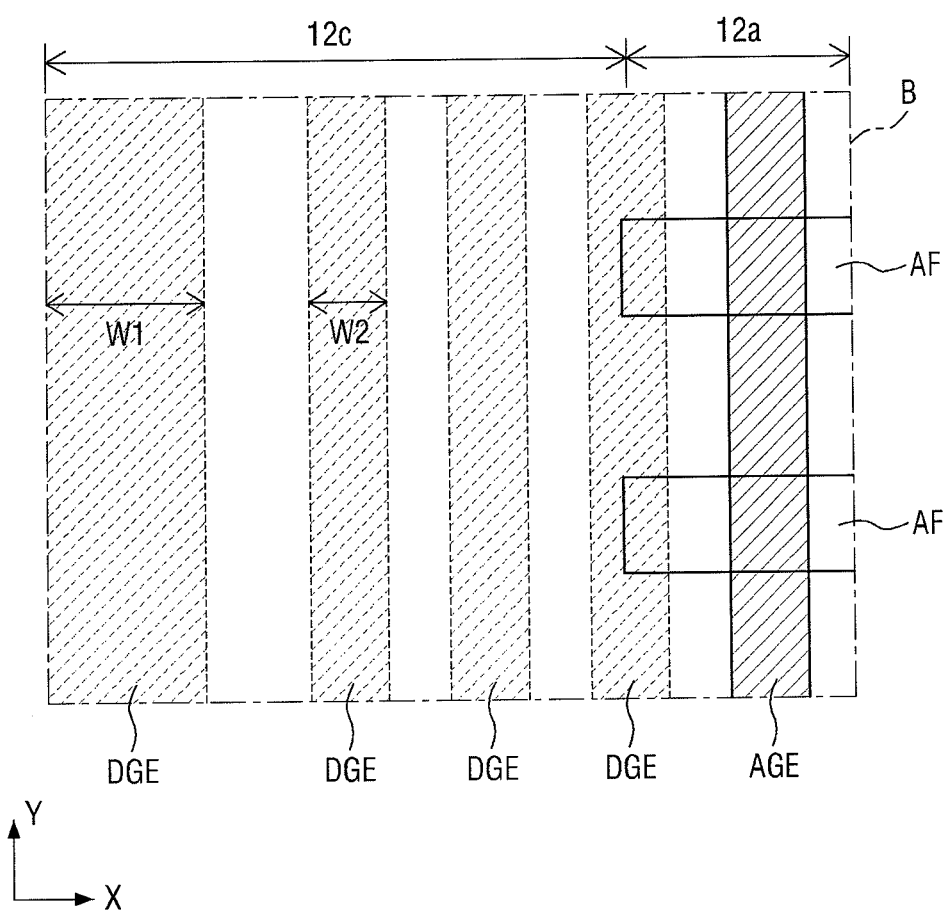
Figure 6:
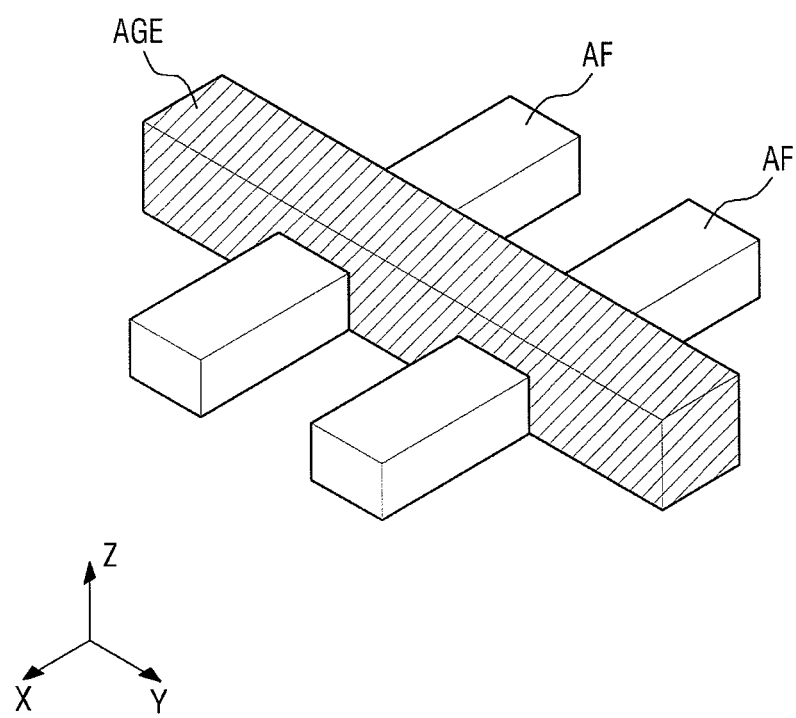

FIG. 3 is an exemplary embodiment of a schematic layout diagram for a first unit in accordance with principles of inventive concepts. FIG. 4 is a layout diagram enlarging area A of FIG. 3 and FIG. 5 is a layout diagram enlarging area B of FIG. 3. FIG. 6 is a perspective view of an active fin and a gate electrode illustrated in FIGS. 4 and 5.

Referring to FIGS. 3 to 6, a first termination area 12b and a second termination area 12c are not placed in a first unit design 12 designed according to the embodiment as illustrated on a border thereof.

In an exemplary design method in accordance with principles of inventive concepts, when the first unit design 12 is formed, only components (for example, an active fin AF and an active gate electrode AGE) required for operating a first unit 12a are placed. In such an example, the active fin AF may be placed in a shape to extend in a first direction X and the gate electrode AGE may be placed on the active fin AF in a shape to extend in a second direction Y that crosses the first direction X.

In exemplary embodiments in accordance with principles of inventive concepts, the first termination area 12b including a dummy active fin DAF that extends in the first direction X are not placed at upper and lower parts of the components (for example, the active fin AF and the gate electrode AGE) required for operating the first unit 12a, as illustrated and the second termination area 12c including a dummy gate electrode DGE that extends in the second direction Y are not placed at left and right sides of the components (for example, the active fin AF and the gate electrode AGE) required for operating the first unit 12a, as illustrated.

That is, in a layout method in accordance with principles of inventive concepts, the first termination area 12b including the dummy active fin DAF and the second termination area 12c including the dummy gate electrode DGE are not considered in forming the first unit design 12. As a result, the first unit design 12 stored in the storage unit 10 of the layout design system 1 illustrated in FIG. 1 does not include the first termination area 12b and the second termination area 12c.

Figure 7:
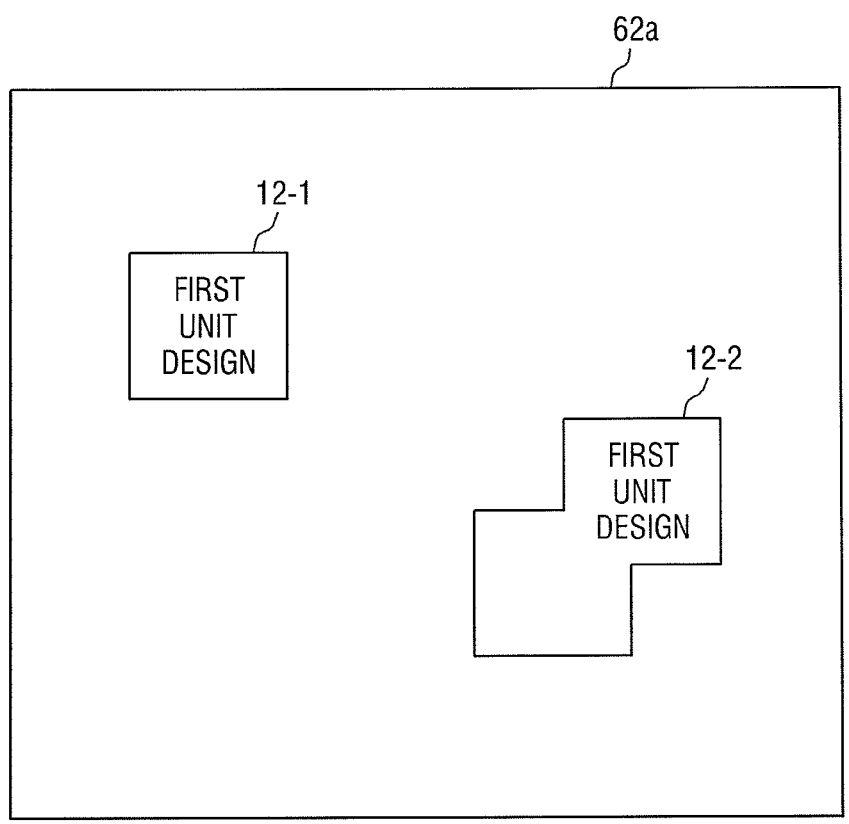

Next, referring to FIG. 2, the first unit is placed in a second unit (S110). Referring to FIGS. 1 and 7, the layout module 22 places first unit designs 12-1 and 12-2 within a boundary 62a of the second unit design. Although the FIG. 7 illustrates that two first unit designs 12-1 and 12-2 are placed within the boundary 62a of the second unit design, inventive concepts are not limited thereto. According to design requirements, the number of the first unit designs 12-1 and 12-2 included in the second unit design 62 may be modified differently therefrom.

Figure 8:
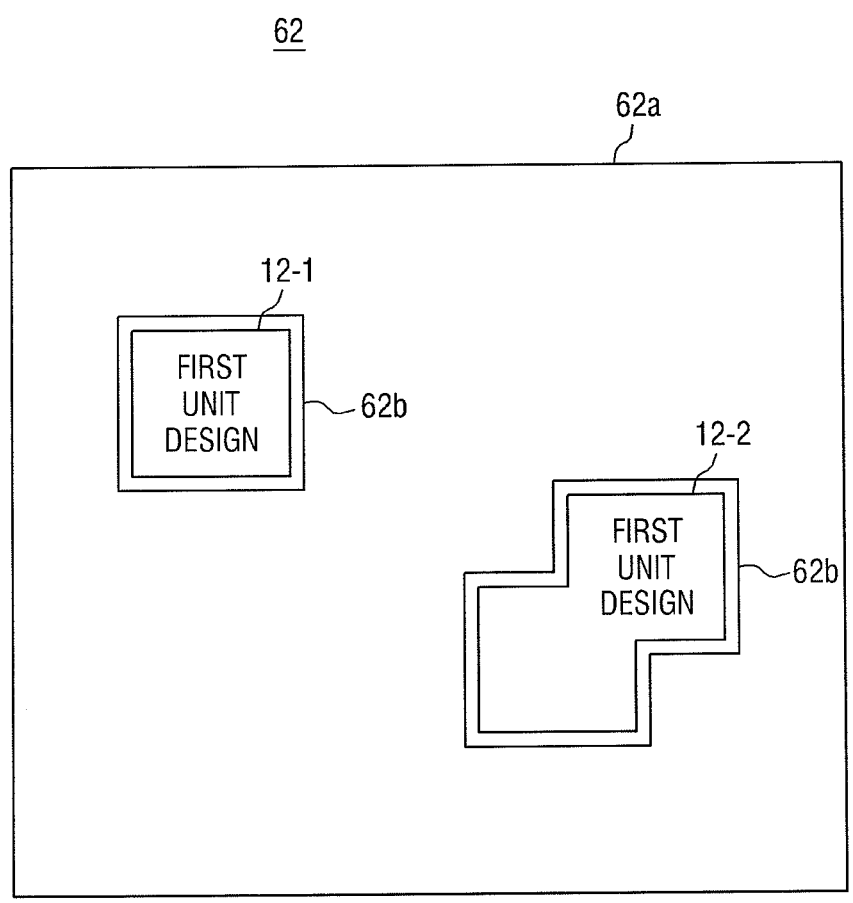

Referring back to FIG. 2, an outline is set (S120). Referring to FIGS. 1 and 8, the outline setting module 24 may set an outline 62b along borders of the first unit designs 12-1 and 12-2 placed within the boundary 62a of the second unit design. Outline 62b may be placed in a closed figure to cover the first unit designs 12-1 and 12-2 as illustrated or may be placed in an open figure to cover parts of the first unit designs 12-1 and 12-2, for example.

Outline 62b may include the first termination area 12b of FIG. 4, including the dummy active fin DAF of FIG. 4 and the second termination area 12c of FIG. 5 including the dummy gate electrode DGE of FIG. 5. The outline 62b may be defined as the halo area in the second unit design 62.

Figure 9:
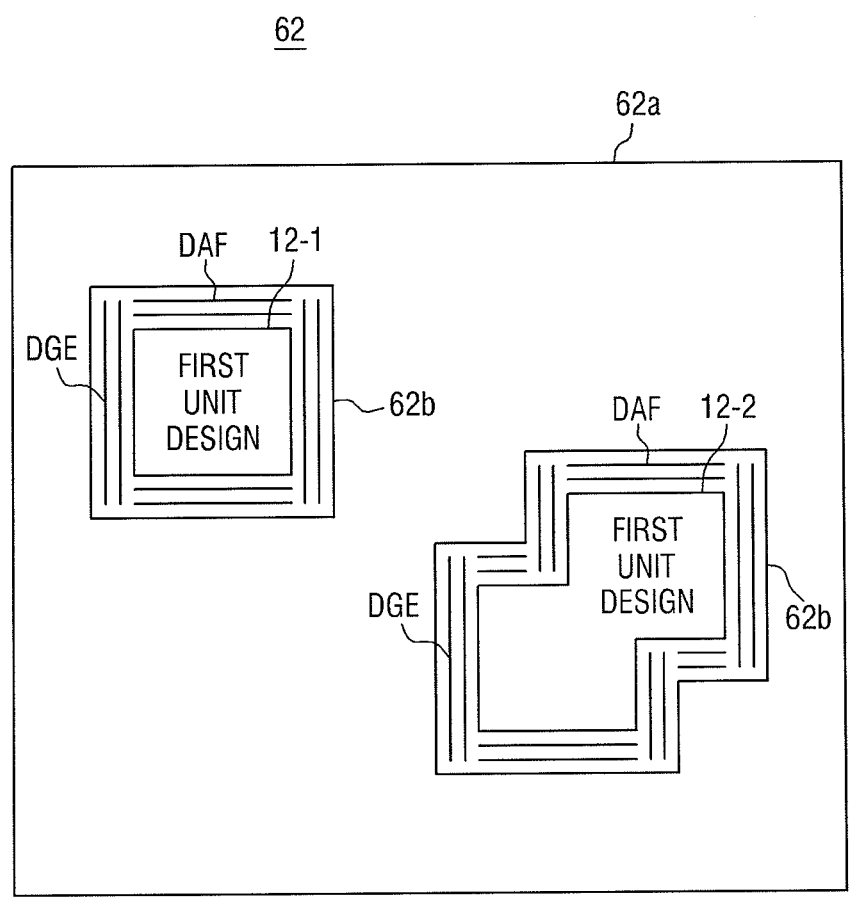

Referring back to FIG. 2, the termination is generated (S130). Referring to FIGS. 1 and 9, the termination generation module 26 may generate the terminations (for example, the dummy active fin DAF and the dummy gate electrode DGE) within the set outline 62b. For example, the termination generation module 26 may generate the dummy active fin DAF in the upper and lower parts of the first unit designs 12-1 and 12-2 and the dummy gate electrode DGE at the left and right sides of the first unit designs 12-1 and 12-2, as illustrated.

In exemplary embodiments in accordance with principles of inventive concepts, the dummy active fin DAF and the dummy gate electrode DGE which the termination generation module 26 generates within the outline 62b may be plural. For example, the dummy active fin DAF may be generated in plural in the upper and lower parts of the first unit designs 12-1 and 12-2 as illustrated in FIG. 4. The dummy gate electrode DGE may be generated in plural at the left and right sides of the first unit designs 12-1 and 12-2 as illustrated in FIG. 5. In such exemplary embodiments, a width W1 of any one of the plurality of dummy gate electrodes DGE may be different from a width W2 of the other one. That is, a plurality of dummy gate electrodes DGE having different widths may be formed at the left and right sides of the first unit designs 12-1 and 12-2. However, inventive concepts are not limited thereto.

In this exemplary embodiment, the second unit is designed through such a process to reduce the space occupied by the second unit design 62, thereby yielding a semiconductor device fabricated using the second unit design 62 that is miniaturized.

Hereinafter, referring to FIGS. 10 to 16, a more detailed description of a method in accordance with principles of inventive concepts will be given.

FIGS. 10 to 16 are diagrams for describing a layout design method in accordance with principles of inventive concepts, such as that illustrated in FIG. 2.

Figure 10:
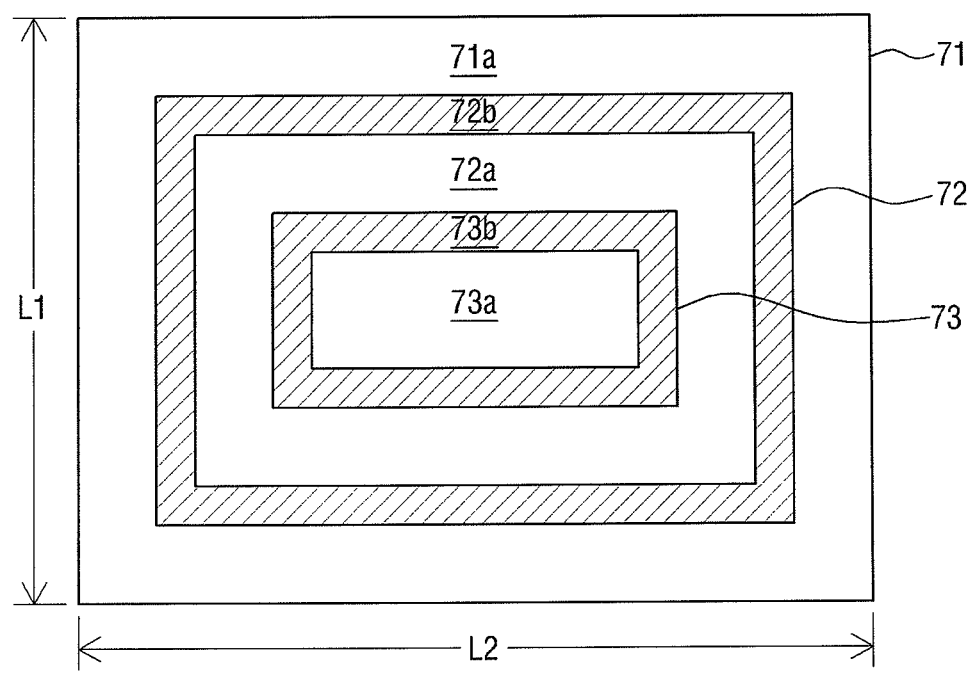
FIGS. 10 to 16 are diagrams for describing an effect of the layout design method illustrated in FIG. 2.
Figure 11:
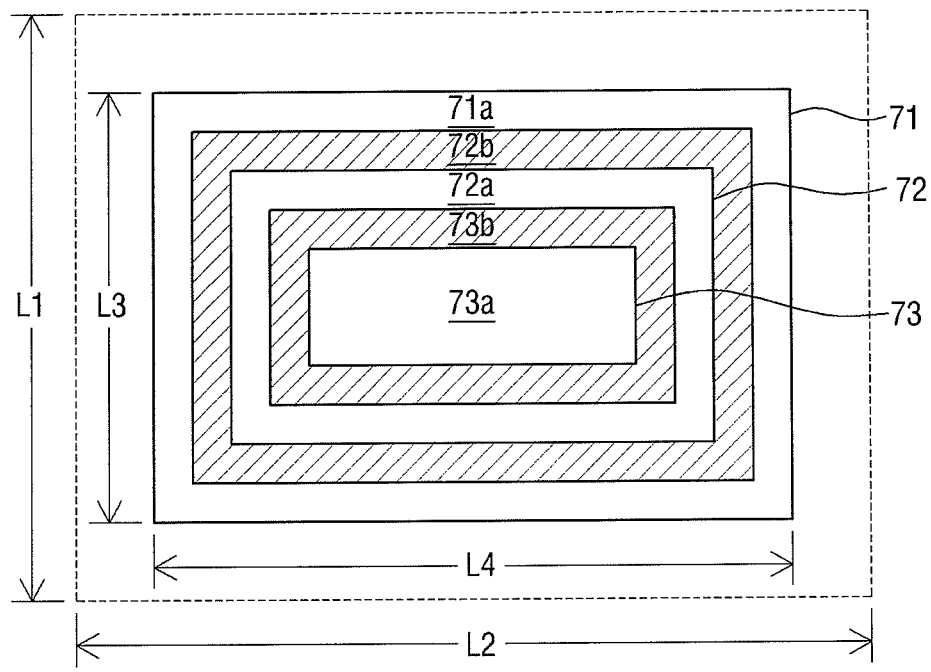

FIG. 10 is a conceptual block diagram of a semiconductor device fabricated not using methods according to inventive concepts and FIG. 11 is a conceptual block diagram of a semiconductor device fabricated using a design produced in a method according to inventive concepts.

Referring to FIG. 10, in a semiconductor device 98a fabricated not according to inventive concepts, respective unit designs 72 and 73 include terminations 72b and 73b. Because terminations 72b and 73b are included, the final size of a unit design 71 cannot but be modified, as will be described in greater detail below.

In exemplary embodiments in accordance with principles of inventive concepts, a first unit design 73 is, for example, a macro (for example, inverter) design, a second unit design 72 is, for example, a block (for example, logic block) design, and a third unit design 71 is, for example, a chip (for example, system on chip (SoC)) design. However, inventive concepts are not limited thereto.

In the example of FIG. 10, provided to illustrated a contrast with a semiconductor device manufactured in accordance with principles of inventive concepts, when the macro (for example, inverter) design 73 is generated, a termination 73b for a component 73a included in the macro is placed at a border of the macro design 73. The macro design 73 including the termination 73b is placed in the block (for example, logic block) design 72 and the termination 72b for a component 72a included in the block is placed at a border thereof. Last, the block design 72 including the termination 72b is placed in the chip (for example, system on chip (SoC)) design 71. In this, example, contrary to a semiconductor device 98b manufactured in accordance with principles of inventive concepts, because termination 73b has been placed, the area of unit design 71 cannot be modified.

In contrast, in a semiconductor device 98b fabricated in accordance with principles of inventive concepts, the unit designs 72 and 73 do not include the terminations 72b and 73b and, as a result, the final size of the unit design 71 may be decreased. A more detailed description thereof will be given below.

Referring to FIG. 11, in an exemplary embodiment in which the semiconductor device 98b is designed according to inventive concepts, when the macro (for example, inverter) design 73 is generated, the termination 73b for the component 73a included in the macro is not placed at the border of the macro design 73. The design 73 in which the termination 73b is not included in the block (for example, logic block) design 72 is placed and the termination 73b for a component 73a included in the macro is together placed at the border of the macro design 73. Termination 73b may include at least one of the dummy active fin DAF and the dummy gate electrode DGE as described above, for example. The block design 72 generated through such a process has a smaller area, or, simply, smaller area, than the block design 72 illustrated in FIG. 10 above.

When the block (for example, logic block) design 72 is generated, the termination 72b for the component 72a included in, that is, associated with, the block is not placed at the border thereof. The block design 72 in which the termination 72b is not included in the chip (for example, system on chip (SoC)) design 71 is placed, and a component 71a included in the chip and the termination 72b for a component 72a included in the block are together placed at the border of the block design 72. Therefore, the chip design 71 generated as such also has a smaller area than the chip design 71 illustrated in FIG. 10 above.

Therefore, when the semiconductor device 98a illustrated in FIG. 10 has a first length L1 in a vertical direction and a second length L2 in a horizontal direction, the semiconductor device 98b illustrated in FIG. 11 has a third length L3 smaller than the first length L1 in the vertical direction and a fourth length L4 smaller than the second direction L2 in the horizontal direction. That is, a semiconductor device fabricated using a design method in accordance with principles of inventive concepts may be miniaturized.

Figure 12:
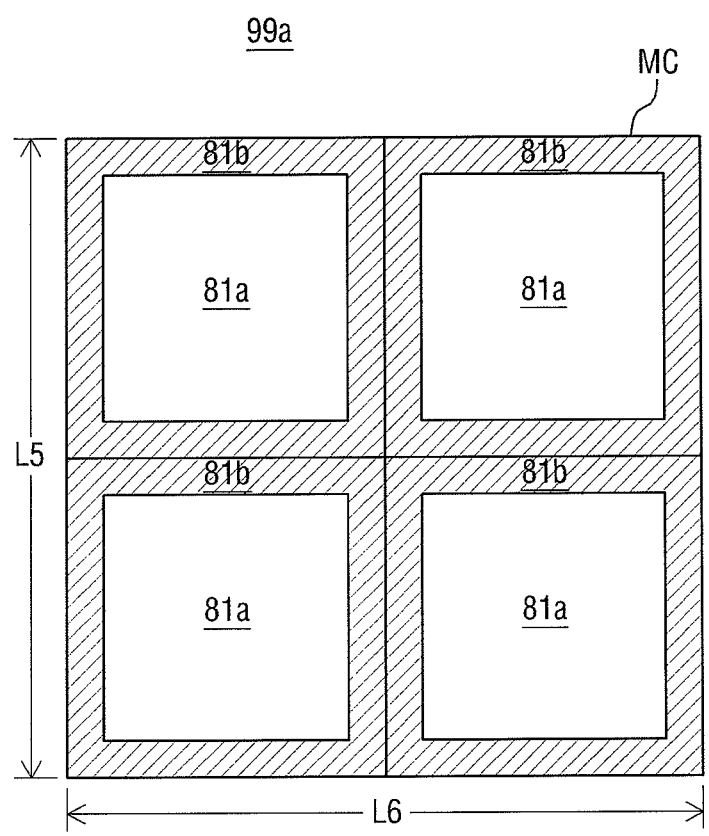
Figure 13:
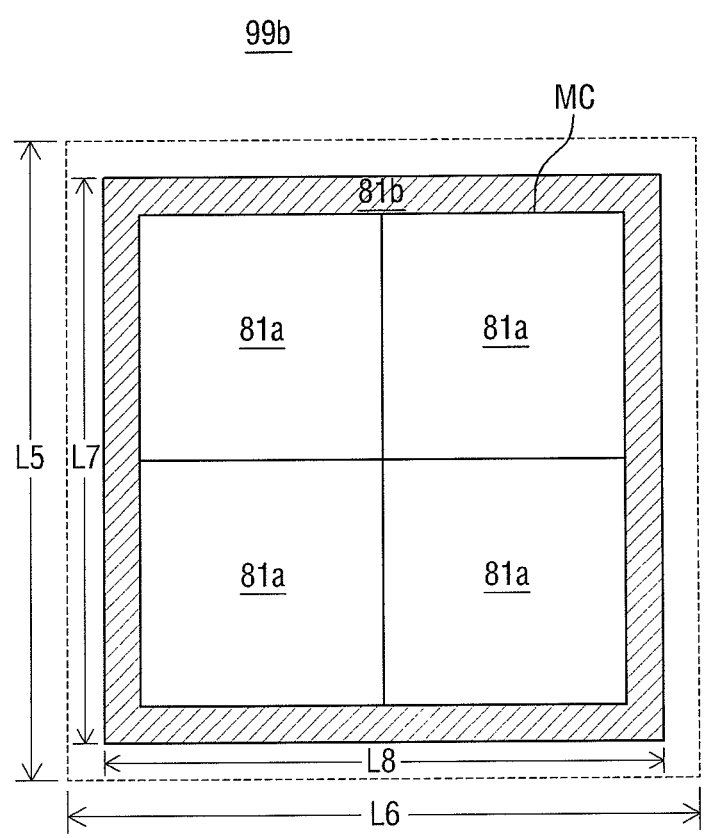
Figure 14:
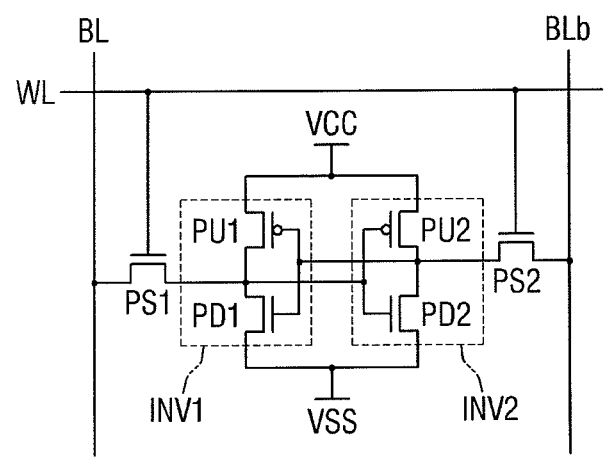
Figure 15:
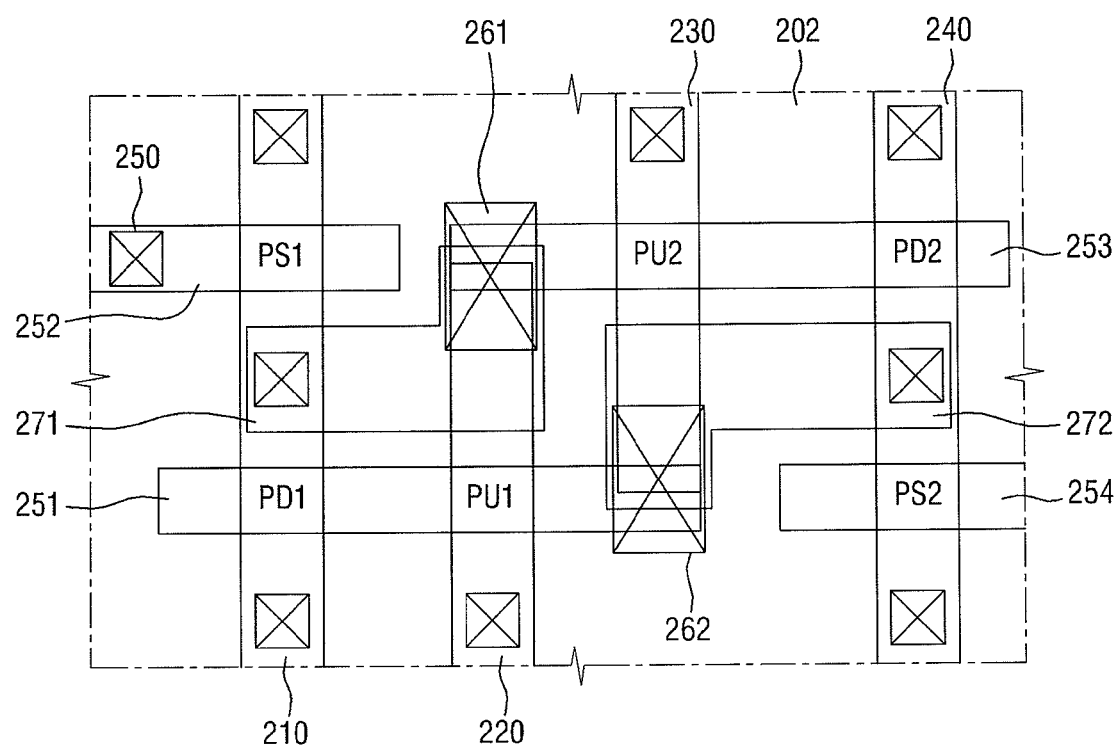

FIG. 12 is a conceptual block diagram of a semiconductor device (for example, a memory device) fabricated not using methods according to inventive concepts and FIG. 13 is a conceptual block diagram of a semiconductor device (for example, a memory device) fabricated using a design method in accordance with principles of inventive concepts. FIG. 14 illustrates one example of a circuit diagram for each memory cell area illustrated in FIGS. 12 and 13. FIG. 15 illustrates one example of a layout diagram for each memory cell area illustrated in FIGS. 12 and 13.

Hereinafter, as an example of the semiconductor device (for example, the memory device), a static random access memory (SRAM) will be described, but inventive concepts are not limited thereto.

Referring to FIG. 12, in a semiconductor device 99a fabricated not according to inventive concepts, each memory cell MC includes a memory cell area 81a and a termination area 81b.

Components of an SRAM cell may be placed in each memory cell area 81a. Referring, for example, to FIG. 14, the memory cell area 81a may include a pair of inverters INV1 and INV2 connected between a power supply node Vcc and a ground node Vss in parallel, and a first pass transistor PS1 and a second pass transistor PS2 connected to output nodes of the respective inverters INV1 and INV2. The first pass transistor PS1 and the second pass transistor PS2 may be connected with a bit line BL and a complementary bit line BLb, respectively. Gates of the first pass transistor PS1 and the second pass transistor PS2 may be connected with a word line WL.

The first inverter INV1 includes a first pull-up transistor PU1 and a first pull-down transistor PD1 connected in series and the second inverter INV2 includes a second pull-up transistor PU1 and a second pull-down transistor PD2 connected in series. The first pull-up transistor PU1 and the second pull-up transistor PU2 may be PFETs and the first pull-down transistor PD1 and the second pull-down transistor PD2 may be NFETs.

In the first inverter INV1 and the second inverter INV2, an input node of the first inverter INV1 is connected with an output node of the second inverter INV2 and an input node of the second inverter INV2 is connected with an output node of the first inverter INV1 in order to constitute one latch circuit.

Referring to FIG. 15, a first active fin 210, a second active fin 220, a third active fin 230, and a fourth active fin 240, which are spaced apart from each other, may be formed to extend longitudinally in one direction (for example, a vertical direction of FIG. 15). The second active fin 220 and the third active fin 230 may have shorter extension lengths than the first active fin 210 and the fourth active fin 240.

A first gate electrode 251, a second gate electrode 252, a third gate electrode 253, and a fourth gate electrode 254 may be formed to extend longitudinally in the other direction (for example, a horizontal direction of FIG. 15) and cross the first active fin 210 to the fourth active fin 240. In exemplary embodiments in accordance with principles of inventive concepts, the first gate electrode 251 may completely cross the first active fin 210 and the second active fin 220 and partially overlap with a final end of the third active pin 230. The third gate electrode 253 may completely cross the fourth active fin 240 and the third active fin 230 and partially overlap with a final end of the second active pin 220. The second gate electrode 252 and the fourth gate electrode 254 may be formed to cross the first active fin 210 and the fourth active fin 240, respectively.

The first pull-up transistor PU1 may be defined around an area where the first gate electrode 251 and the second active fin 220 cross each other, the first pull-down transistor PD1 may be defined around an area where the first gate electrode 251 and the first active fin 210 cross each other, and the first pass transistor PS1 may be defined around an area where the second gate electrode 252 and the first active fin 210 cross each other. The second pull-up transistor PU2 may be defined around an area where the third gate electrode 253 and the third active fin 230 cross each other, the second pull-down transistor PD2 may be defined around an area where the third gate electrode 253 and the fourth active fin 240 cross each other, and the second pass transistor PS2 may be defined around an area where the fourth gate electrode 254 and the fourth active fin 240 cross each other.

Although not illustrated in detail, a source/drain may be formed at both sides of an area where the first to fourth gate electrodes 251 to 254 and the first to fourth active fins 210, 220, 230, and 240 cross each other, and a plurality of contacts 250 may be formed.

A first shared contact 261 may connect the second active fin 220, the third gate line 253, and a wire 271 simultaneously. A second shared contact 262 may connect the third active fin 230, the first gate line 251, and a wire 272 simultaneously.

Referring back to FIG. 12, in this contrary example that does not employ a method in accordance with principles of inventive concepts, the dummy active fin and the dummy gate electrode may be formed in each termination area 81b. The dummy gate electrode may be formed in the termination area 81b placed in an area (for example, upper and lower parts of the memory cell area 81a) parallel to the gate lines 251 to 254 of FIG. 15 and the dummy active fin may be formed in the termination area 81b placed in an area (for example, left and right sides of the memory cell area 81a) parallel to the active fins 210 to 240 of FIG. 15.

In some embodiments of the present invention, each of the dummy gate electrode and the dummy active fin may be placed in plural as illustrated in FIGS. 4 and 5. Referring to FIG. 13, a semiconductor device 99b fabricated using a design implemented in accordance with principles of inventive concepts does not have a form in which the termination area 81b is placed in each memory cell MC as illustrated. That is, in the case where the semiconductor device 99b is fabricated using a design produced in accordance with principles of inventive concepts, when a memory cell array is designed, only the memory cell area 81a is first placed and thereafter, the termination area 81b is placed on a border thereof. As a result, in exemplary embodiments in accordance with principles of inventive concepts, the termination area 81b is not present between memory cells MCs adjacent to each other and the memory cell array is smaller than the size illustrated in the contrary example of FIG. 12.

In exemplary embodiments in accordance with principles of inventive concepts, when the semiconductor device 99a illustrated in FIG. 12 has a fifth length L5 in the vertical direction and a sixth length L6 in the horizontal direction, the semiconductor device 99b illustrated in FIG. 13 has a seventh length L7 smaller than the fifth length L5 in the vertical direction and an eighth length L8 smaller than the sixth length L6 in the horizontal direction. That is, the semiconductor device (for example, the memory device) fabricated using a design method in accordance with principles of inventive concepts may be smaller than a conventionally-designed semiconductor device.

Each memory cell area 81a constituted by a 6T SRAM element including six transistors is described in the above as an example, but inventive concepts are not limited thereto.

Figure 16:
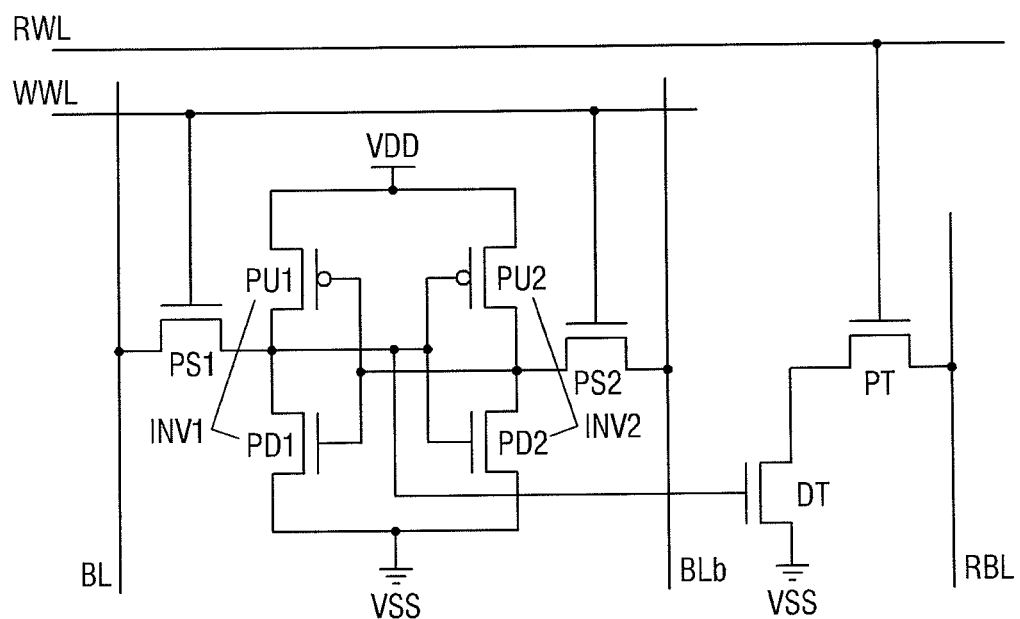

Referring to FIG. 16, another exemplary embodiment of a semiconductor device in accordance with principles of inventive concepts will be described. FIG. 16 illustrates another example of a circuit diagram for each memory cell area illustrated in FIGS. 12 and 13. Each memory cell area 81a according to another exemplary embodiment in accordance with principles of inventive concepts may include first and second inverters INV1 and INV2 connected between a power supply node VDD and a ground node VSS in parallel, a first selection transistor PS1 and a second selection transistor PS2 connected to output nodes of the inverters INV1 and INV2, respectively, a drive transistor DT controlled by an output of the first inverter INV1, and a pass transistor PT connected to an output node of the drive transistor DT. That is, in the exemplary embodiment, each memory cell area 81a may include an 8T SRM element including eight transistors.

The first selection transistor PS1 and the second selection transistor PS2 may be connected with a bit line BL and a complementary bit line BLb, respectively. Gates of the first selection transistor PS1 and the second selection transistor PS2 may be connected with a write word line WWL.

The first inverter INV1 includes a first pull-up transistor PU1 and a first pull-down transistor PD1 connected in series and the second inverter INV2 includes a second pull-up transistor PU2 and a second pull-down transistor PD2 connected in series. The first pull-up transistor PU1 and the second pull-up transistor PU2 may be PFETs and the pull-down transistor PD1 and the second pull-down transistor PD2 may be NFETs.

In the first inverter INV1 and the second inverter INV2, an input node of the first inverter INV1 may be connected with an output node of the second inverter INV2 and an input node of the second inverter INV2 may be connected with an output node of the first inverter INV1 in order to constitute one latch circuit.

The drive transistor DT and the pass transistor PT may be used to read data stored in the latch circuit constituted by the first inverter INV1 and the second inverter INV2. A gate of the drive transistor DT may be connected to the output node of the first inverter INV1 and a gate of the pass transistor PT may be connected to a read word line RWL. An output of the drive transistor DT may be connected to the ground node VSS as illustrated, and the output of the pass transistor PT may be connected to a read bit line RBL as illustrated.

By such a circuit configuration, in the exemplary semiconductor device in accordance with principles of inventive concepts it is possible to access data stored in the SRAM element through two ports (for example, double ports). First, it is possible to write data or read data stored in the latch circuit with respect to the latch circuit constituted by the first inverter INV1 and the second inverter INV2 by selecting the write word line WWL, the bit line BL, and the complementary bit line BLb. That is, this path may be used as a first port. It is also possible to read data stored in the latch circuit constituted by the first inverter INV1 and the second inverter INV2 by selecting the read word line RWL and the read bit line RBL. That is, this path may be used as a second port.

Because an operation of reading data based on the second port may be performed independently from an operation of the first port in the SRAM element, the data stored in the latch circuit is not influenced. In other words, an operation of reading the data stored in the latch circuit may be performed independently from an operation of writing data in the latch circuit.

Figure 17A:
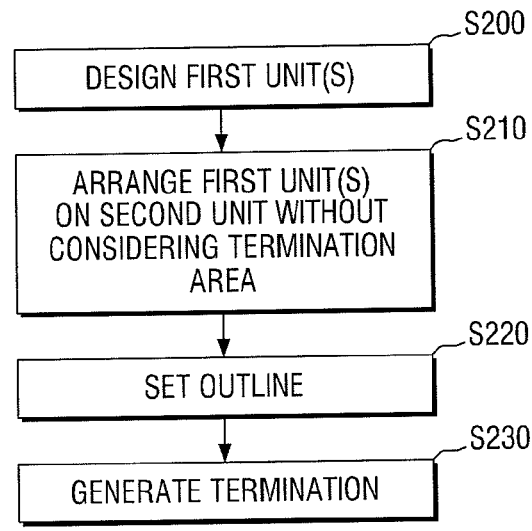
FIG. 17A is a flowchart illustrating a layout design method according to some embodiments of the present invention.
Figure 17B:
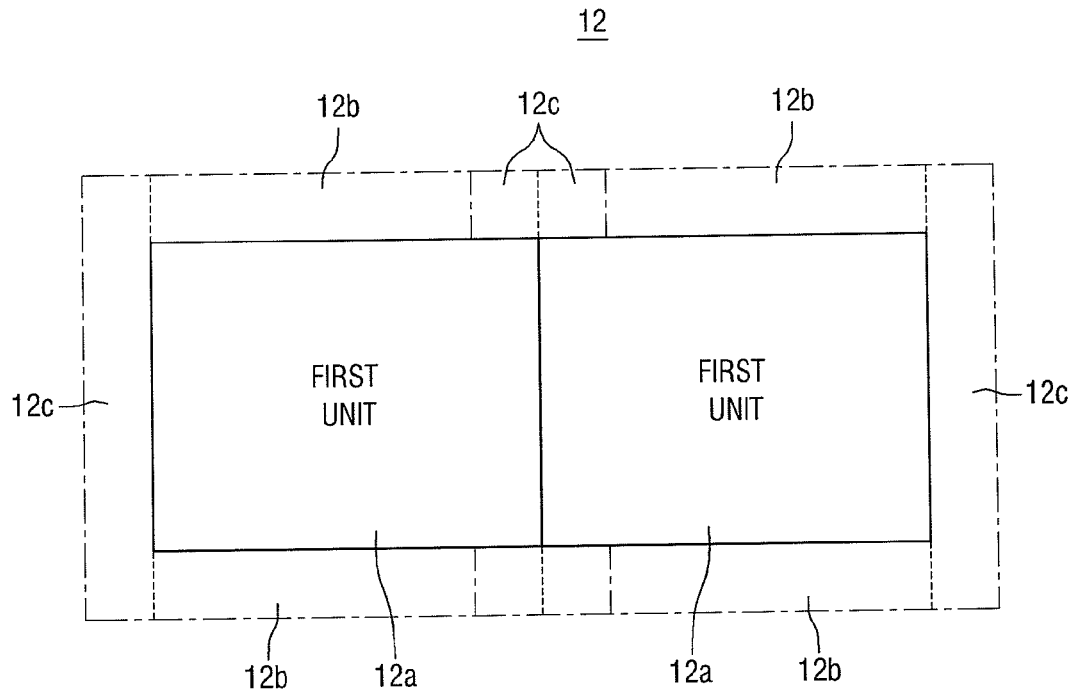
FIG. 17B is an exemplary diagram in which a first unit design is placed by the layout design method according to some embodiments of the present invention.

Referring to FIGS. 1, 17A, and 17B, another operation of layout design system 1 according to exemplary embodiments in accordance with principles of inventive concepts will be described. Detailed descriptions which would be duplicative of earlier descriptions will not be repeated here, and differences therebetween will be the primary focus of the following description.

FIG. 17A is a flowchart illustrating a layout design method according to exemplary embodiments in accordance with principles of inventive concepts. FIG. 17B is an exemplary diagram in which a first unit design is placed by the layout design method according to exemplary embodiments in accordance with principles of inventive concepts.

Referring to FIGS. 1 and 17A, a first unit is designed (S200). In this exemplary embodiment, when the first unit is designed, the first unit is designed so that the termination is placed on a border of the first unit. That is, in the exemplary embodiment, the termination areas 12b and 12c of FIG. 3 are placed on the border of the first unit design 12.

Referring to FIGS. 3 to 5, in the design method according to this exemplary embodiment, when the first unit design 12 is formed, components (for example, an active fin AF and a gate electrode AGE) required for operating a first unit 12a may be placed and a first termination area 12b including a dummy active fin DAF that extends in a first direction X may be placed in upper and lower parts of the components (for example, the active fin AF and the gate electrode AGE) required for operating the first unit 12a, and a second termination area 12c including the dummy gate electrode DGE that extends in a second direction Y may be placed at left and right sides of the components (for example, the active fin AF and the gate electrode AGE) required for operating the first unit 12a.

That is, in the layout method according to this exemplary embodiment, the first termination area 12b including the dummy active fin DAF and the second termination area 12c including the dummy gate electrode DGE may be considered in forming the first unit design 12. As a result, the first unit design 12 stored in the storage unit 10 of the layout design system 1 illustrated in FIG. 1 may include the first termination area 12b and the second termination area 12c.

Next, referring to FIGS. 1 and 17A, the first unit is placed in a second unit (S210). In an exemplary layout design method in accordance with principles of inventive concepts, the first unit design 12 may be placed while the first termination area 12b of FIG. 3 and the second termination area 12c of FIG. 3 included in the first unit design 12 are not considered. That is, assuming that the first unit design 12 of FIG. 3 includes only the components (for example, the active fin AF and the gate electrode AGE) required for operating the first unit 12a, the first unit design 12 may be placed.

As a result, in some exemplary embodiments in accordance with principles of inventive concepts, when the first unit design 12 is placed, the first unit design 12 may be placed so that at least one of the first termination area 12b and the second termination area 12c overlaps with the components (for example, the active fin AF and the gate electrode AGE) required for operating the first unit 12a, as illustrated in FIG. 17B. FIG. 17B, for example, illustrates that the second termination area 12c is placed to overlap with the components (for example, the active fin AF and the gate electrode AGE) required for operating the first unit 12a, however inventive concepts are not limited thereto.

Next, referring to FIG. 17A, an outline is set (S220). In exemplary embodiments in accordance with principles of inventive concepts an outline, that is, a halo area in second unit design 62 is set using a termination area that does not overlap components required for the operation of first unit 12a. That is, a portion of first and second termination areas 12b/12c that does not overlap components (such as an active fin AF or active gate electrode AGE) required for operation of first unit 12a may be used to define a halo, or outline, area in the second unit design 62.

Next, referring to FIG. 17A, a termination is generated on the outline (S230). A detailed description of termination generation on an outline area in accordance with principles of inventive concepts was given above and, for clarity and brevity of description, will not be repeated here.

When a second unit is designed by such a method, a dimension of the second unit design 62 may be reduced according principles of inventive concepts, as previously described. As a result, a semiconductor device fabricated using the second unit design 62 in accordance with principles of inventive concepts may also be miniaturized.

A layout design method in accordance with principles of inventive concepts as described as above may be implemented by a computer readable code in a computer readable recording medium. The computer readable recording medium includes all types of recording device in which data readable by a computer system is stored. Examples of the computer readable recording medium include ROM, RAM, CD-ROM, a magnetic tape, a floppy disk, an optical data storing device and the computer readable recording medium may also be implemented in a form of a carrier wave (for example, transmission through the Internet). The computer readable recording medium is distributed in computer systems connected through a network and a computer readable code is stored therein and executed in a distributed manner.

Next, referring to FIGS. 18A to 19, a SoC system including the semiconductor device in accordance with principles of inventive concepts will be described.

Figure 18A:
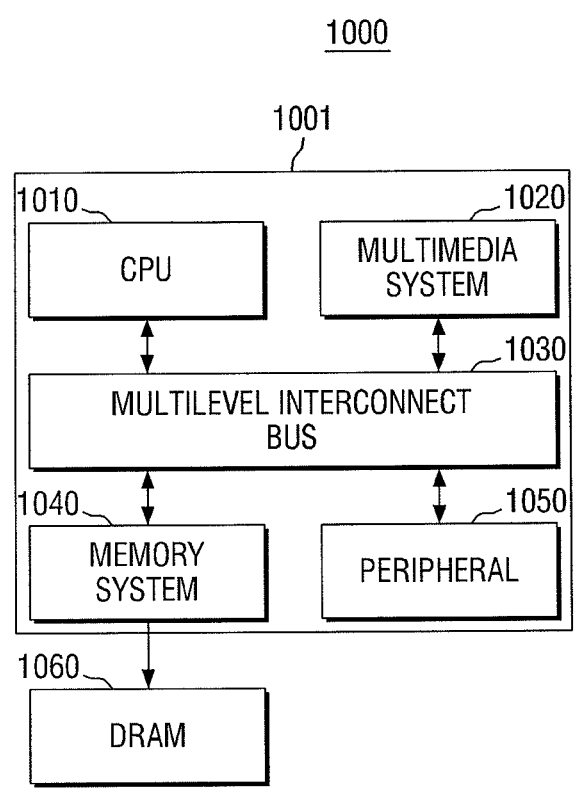
FIG. 18A is a block diagram of an SoC system including a semiconductor device in accordance with principles of inventive concepts.
Figure 18B:
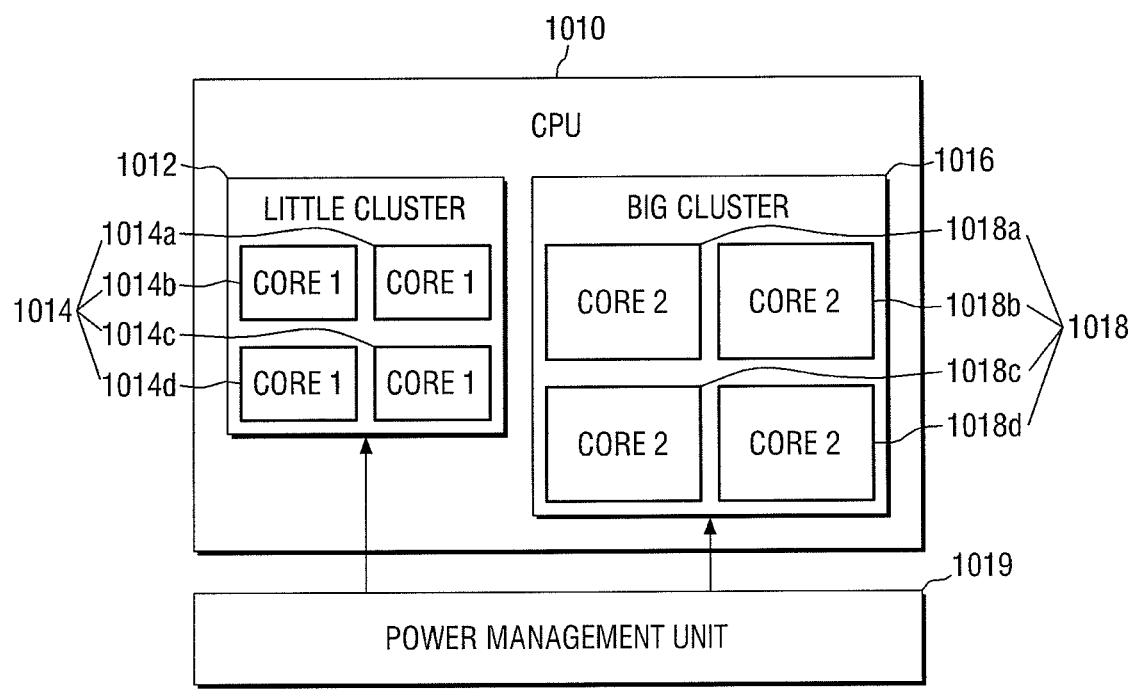
FIG. 18B is a block diagram illustrating a schematic configuration of a central processing unit of FIG. 18A.

FIG. 18A is a block diagram of a SoC system including a semiconductor device in accordance with principles of inventive concepts. FIG. 18B is a block diagram illustrating a schematic configuration of a central processing unit of FIG. 18A. FIG. 19 is a diagram illustrating a state in which the semiconductor device of FIG. 18A is packaged.

First, referring to FIG. 18A, a SoC system 1000 includes an application processor 1001 and a DRAM 1060.

The application processor 1001 may include a central processing unit 1010, a multimedia system 1020, a bus 1030, a memory system 1040, and a peripheral circuit 1050.

The central processing unit 1010 may perform a calculation required to drive the SoC system 1000. In exemplary embodiments in accordance with principles of inventive concepts, the central processing unit 1010 may be configured by a multicore environment including a plurality of cores.

In exemplary embodiments in accordance with principles of inventive concepts, the central processing unit 1010 may be configured to include a first cluster 1012 and a second cluster 1016 as illustrated in FIG. 18B.

The first cluster 1012 may be placed in the central processing unit 1010 and the first cluster 1012 may include n (herein, n is a natural number) first cores 1014. In FIG. 18B, the first cluster 1012 includes four (that is, n=4) first cores (1014*a* to 1014*d*) as an example for easy description, but the inventive concepts are not limited thereto.

Second cluster 1016 may be placed in the central processing unit 1010 and the second cluster 1016 may include n second cores 1018. The second cluster 1016 may be placed separately from the first cluster 1012 as illustrated. Second cluster 1016 includes four (that is, n=4) second cores (1018*a* to 1018*d*) as an example for easy description, but the inventive concepts are not limited thereto.

FIG. 18B illustrates that the number of the first cores 1014 included in the first cluster 1012 and the number of the second cores 1018 included in the second cluster 1016 are the same, but the inventive concepts are not limited thereto. In exemplary embodiments in accordance with principles of inventive concepts, the number of the first cores 1014 included in the first cluster 1012 and the number of the second cores 1018 included in the second cluster 1016 may be different from each other unlike what is illustrated.

FIG. 18B illustrates that only the first cluster 1012 and the second cluster 1016 are placed in the central processing unit 1010, but inventive concepts are not also limited thereto. A third cluster (not illustrated) separated from the first and second clusters 1012 and 1016 and including a third core (not illustrated) may be additionally placed in the central processing unit 1010, for example.

In an exemplary embodiment, a calculation amount per unit time of the first core 1014 included in the first cluster 1012 and a calculation amount per unit time of the second core 1018 included in the second cluster 1016 may be different from each other.

In exemplary embodiments in accordance with principles of inventive concepts, the first cluster 1012 may be, for example, a litter cluster and the second cluster 1016 may be, for example, a big cluster. In this case, the calculation amount per unit time of the first core 1014 included in the first cluster 1012 may be smaller than the calculation amount per unit time of the second core 1018 included in the second cluster 1016.

Accordingly, a calculation amount per unit time when all of the first cores 1014 included in the first cluster 1012 are enabled to perform a calculation may be smaller than that when all of the second cores 1018 included in the second cluster 1016 are enabled to perform the calculation.

In exemplary embodiments, calculation amounts per unit time among 1-1-th to 1-4-th cores 1014*a* to 1014*d* included in the first cluster 1012 may be the same as each other and calculation amounts per unit time among 2-1-th to 2-4-th cores 1018*a* to 1018*d* included in the second cluster 1016 may also be the same as each other. That is, for example, assuming that the calculation amount per unit time of each of the 1-1-th to 1-4-th cores 1014*a* to 1014*d* is 10, the calculation amount per unit time of each of the 2-1 to 2-4 cores 1018*a* to 1018*d* may be 40.

A power management unit 1019 may enable or disable the first cluster 1012 and the second cluster 1016, for example. In detail, the power management unit 1019 may enable the first cluster 1012 and disable the second cluster 1016 when the calculation is required by the first cluster 1012. On the contrary, the power management unit 1019 may enable the second cluster 1016 and disable the first cluster 1012 when the calculation is required by the second cluster 1016. The power management unit 1019 may enable the first cluster 1012 and disable the second cluster 1016, but enable the 1-1 core 1014*a* and disable the 1-2-th to 1-4-th cores 1014*b* to 1014*d* even within the first cluster 1012, when a calculation amount to be performed may be sufficiently executed through the 1-1 core 1014*a* included in the first cluster 1012. In other words, the power management unit 1019 according to the embodiment may determine whether to enable both the first and second clusters 1012 and 1016 and determine whether to enable each of the 1-1-th to 1-4-th cores 1014*a* to 1014*d* included in the first cluster 1012 and determine whether to enable each of the 2-1-th to 2-4-th cores 1018*a* to 1018*d* included in the second cluster 1016.

In exemplary embodiments in accordance with principles of inventive concepts, the power management unit 1019's enabling the first and second clusters 1012 and 1016 and/or the plurality of cores 1014*a* to 1014*d* and 1018*a* to 1018*d* included therein may mean that the power management unit 1019 supplies power to the first and second clusters 1012 and 1016 and/or the plurality of cores 1014*a* to 1014*d* and 1018*a* to 1018*d* included therein to operate the clusters and cores. The power management unit 1019's disabling the first and second clusters 1012 and 1016 and/or the plurality of cores 1014*a* to 1014*d* and 1018*a* to 1018*d* included therein may mean that the power management unit 1019 interrupts the power supplied to the first and second clusters 1012 and 1016 and/or the plurality of cores 1014*a* to 1014*d* and 1018*a* to 1018*d* to stop the operation of the clusters and cores.

The power management unit 1019 enables only the specific clusters 1012 and 1016 and/or the plurality of cores 1014a to 1014d and 1018a to 1018d included therein according to an operating environment of the SoC system 1000 to manage power consumption of the entire SoC system 1000.

Referring back to FIG. 18A, the multimedia system 1020 may be used to perform various multimedia functions in the SoC system 1000. The multimedia system 1020 may include a 3D engine module, a video codec, a display system, a camera system, a post-processor, and the like.

The bus 1030 may be used when the central processing unit 1010, the multimedia system 1020, the memory system 1040, and the peripheral circuit 1050 perform data communication with each other. In exemplary embodiments in accordance with principles of inventive concepts, the bus 1030 may have a multi-layer structure. In detail, as an example of the bus 1030, a multi-layer advanced high-performance bus (AHB) or a multi-layer advanced extensible interface (AXI) may be used, but the inventive concepts are not limited thereto.

The memory system 1040 may provide an environment required when the application processor 1001 operates at a high speed while being connected with an external memory (for example, the DRAM 1060). In exemplary embodiments in accordance with principles of inventive concepts, the memory system 1040 may include a separate controller (for example, a DRAM controller) for controlling the external memory (for example, the DRAM 1060).

The peripheral circuit 1050 may provide an environment required when the SoC system 1000 smoothly accesses an external device (for example, a main board). As a result, the peripheral circuit 1050 may include various interfaces that enable an external device connected to the SoC system 1000 to be compatible.

The DRAM 1060 may serve as an operating memory required for the application processor 1001 to operate. In exemplary embodiments in accordance with principles of inventive concepts, the DRAM 1060 may be placed outside the application processor 1001 as illustrated. In detail, the DRAM 1060 may be packaged with the application processor 1001 in a package on package (PoP) form as illustrated in FIG. 19.

Figure 19:
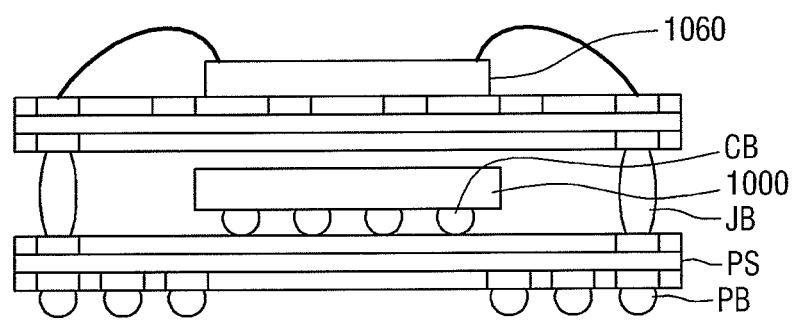
FIG. 19 is a diagram illustrating a state in which the semiconductor device of FIG. 18A is packaged.

Referring to FIG. 19, such a semiconductor package may include a package substrate PS, the DRAM 1060, and the application processor 1001.

The package substrate PS may include a plurality of package balls PB. The plurality of package balls PB may be electrically connected with chip balls CB of the application processor 1001 through a signal line in the package substrate PS and electrically connected with a joint ball JB through the signal line in the package substrate PS.

Meanwhile, the DRAM 1060 may be electrically connected with the joint ball JB through wire bonding as illustrated.

The application processor 1001 may be placed below the DRAM 1060. The chip balls CB of the application processor 1001 may be electrically connected with the DRAM 1060 through the joint ball JB.

FIG. 19 illustrates that the DRAM 1060 is placed outside the application processor 1001, but the inventive concepts are not limited thereto, and DRAM 1060 may be placed inside the application processor 1001, for example.

The aforementioned semiconductor devices 98b and 99b according to the embodiments in accordance with principles of inventive concepts may be provided as any one of the components of the SoC system 1000. That is, the semiconductor device 98b may be adopted as one component of the multimedia system 1020 or the peripheral circuit 1050, for example and semiconductor device 99b may be adopted as one component of a cache memory for enhancing a processing speed of the central processing unit 1010, but the inventive concepts are not limited thereto.

Next, referring to FIG. 20, an electronic system including a semiconductor device in accordance with principles of inventive concepts will be described.

Figure 20:
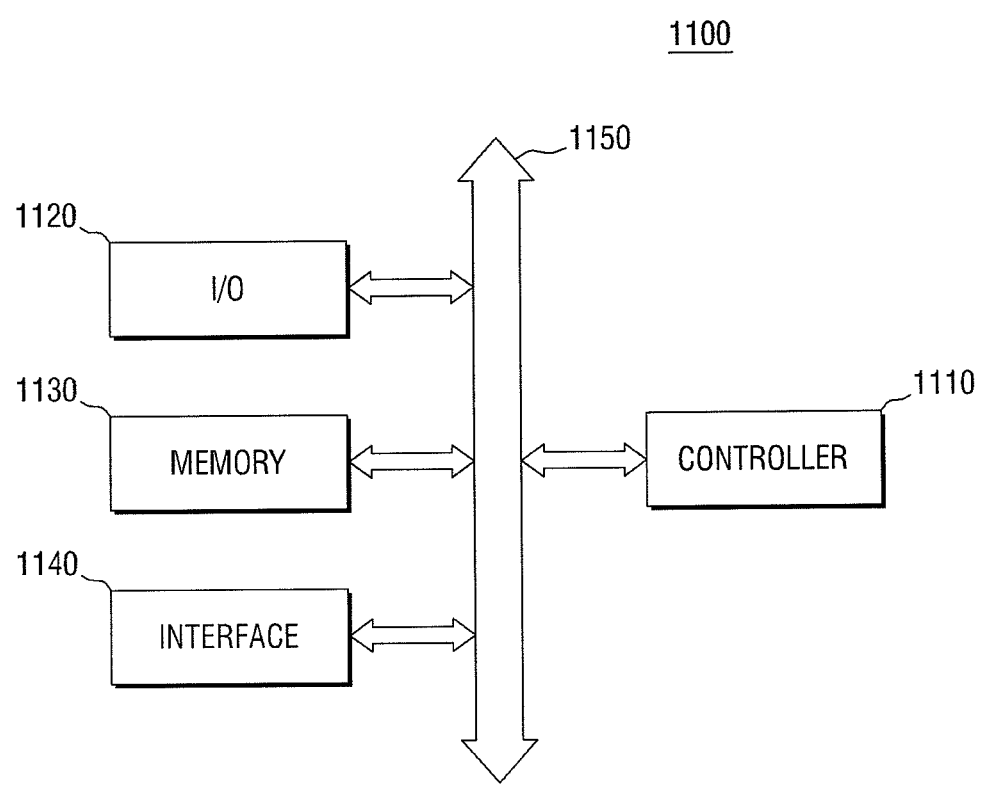
FIG. 20 is a block diagram of an electronic system including the semiconductor device in accordance with principles of inventive concepts.

FIG. 20 is a block diagram of an electronic system including the semiconductor device in accordance with principles of inventive concepts.

Referring to FIG. 20, an electronic system 1100 according to exemplary embodiments in accordance with principles of inventive concepts may include a controller 1110, an input/output (I/O) device 1120, a memory device 1130, an interface 1140, and a bus 1150. The controller 1110, the input/output device 1120, the memory device 1130 and/or the interface 1140 are joined to each other through the bus 1150. The bus 1150 corresponds to a path through which data moves.

The controller 1110 may include at least one of a microprocessor, a digital signal processor, a microcontroller, and at least one of logic elements that may perform similar functions thereto. The input/output device 1120 may include a keypad, a keyboard, and a display device. The memory device 1130 may store data and/or commands. The interface 1140 may serve to transmit data to a communication network or receive data from the communication network. The interface 1140 may be a wired or wireless type. For example, the interface 1140 may include an antenna or a wired/wireless transceiver.

Although not illustrated, the electronic system 1100 as an operating memory for improving an operation of the controller 1110 may further include a high-speed DRAM and/or SRAM. In such embodiments, as the operating memory, the aforementioned semiconductor device 99b in accordance with principles of inventive concepts may be adopted. The aforementioned semiconductor device 98b in accordance with principles of inventive concepts may be provided in the memory device 1130 or provided as parts of the controller 1110, the input/output (I/O) device 1120, for example.

The electronic system 1100 may be applied to a personal digital assistant (PDA), a portable computer, a web tablet, a wireless phone, a mobile phone, a digital music player, a memory card, or any electronic product that may transmit and/or receive information under a wireless environment.

Figure 21:
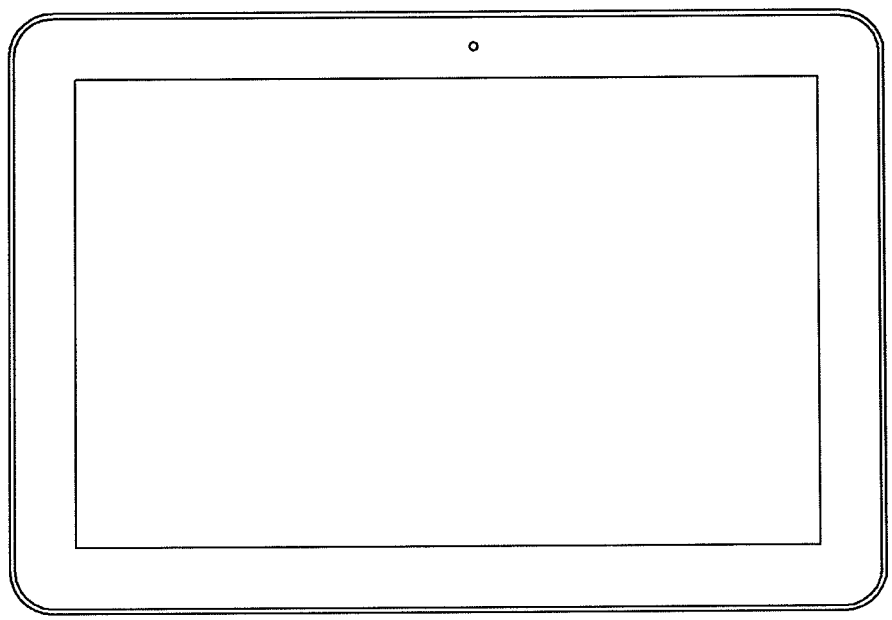
FIGS. 21 to 23 are exemplary semiconductor systems capable of adopting the semiconductor device according to some embodiments of the present invention.
Figure 22:
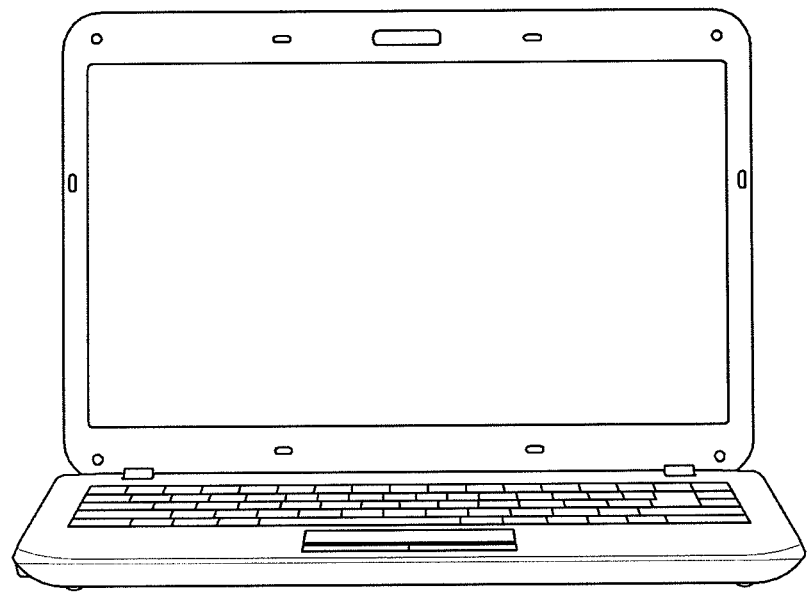
Figure 23:
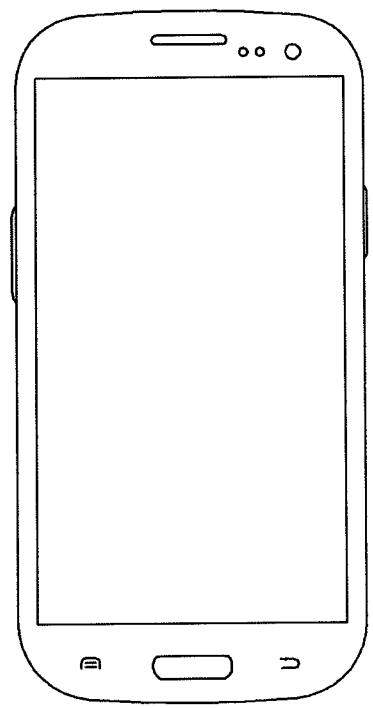

FIGS. 21 to 23 are exemplary semiconductor systems capable of adopting the semiconductor device in accordance with principles of inventive concepts.

FIG. 21 is a diagram illustrating a tablet PC 1200. FIG. 22 is a diagram illustrating a notebook 1300. FIG. 23 illustrates a smart phone 1400. At least one of the semiconductor devices 98b and 99b in accordance with principles of inventive concepts may be used in the tablet PC 1200, the notebook 1300, and the smart phone 1400.

In exemplary embodiments in accordance with principles of inventive concepts, the semiconductor system may be implemented by a computer, an ultra mobile PC (UMPC), a workstation, a net-book, a personal digital assistant (PDA), a portable computer, a wireless phone, a mobile phone, an e-book, a portable multimedia player (PMP), a mobile game machine, a navigation device, a black box, a digital camera, a 3-dimensional television, a digital audio recorder, a digital audio player, a digital picture recorder, a digital picture player, a digital video recorder, a digital video player, for example.

The foregoing is illustrative of inventive concepts and is not to be construed as limiting thereof. Although a few exemplary embodiments in accordance with principles of inventive concepts have been described, those skilled in the art will readily appreciate that many modifications are possible without materially departing from the novel teachings and advantages thereof. Accordingly, all such modifications are intended to be included within the scope of inventive concepts as defined in the claims.

What is claimed is:

1. A semiconductor design system, comprising:
a processor and memory configured as:
a layout module to supply termination-free unit designs, each having a plurality of sides, wherein the layout module is configured to combine a plurality of termination-free unit designs in a layout;
an outline setting module to set an outline on borders of each termination-free unit design in the layout; and
a termination generation module to establish terminations for the unit designs within the respective borders of the unit designs, wherein the terminations are not included on all sides of a unit design and border areas associated with a termination-free side of the unit design may be employed for placement of a neighboring unit design.

2. The semiconductor design system of claim 1, wherein the termination-free unit design is a cell level design.

3. The semiconductor design system of claim 1, wherein the termination-free unit design is a macro-level design.

4. The semiconductor design system of claim 1, wherein the terminations includes at least one of a dummy gate electrode and a dummy active fin.

5. The semiconductor design system of claim 4, wherein the terminations includes a first termination including the dummy gate electrode and the second termination including a dummy active fin,
the first termination is placed to extend in a first direction along the border of a termination-free unit design, and
the second termination is placed to extend in a second direction crossing the first direction along the border of a combination of the termination-free unit designs.

6. The semiconductor design system of claim 5, wherein the first termination includes the plurality of dummy gate electrodes, and
the second termination includes the plurality of dummy active fins.

7. The semiconductor design system of claim 1, wherein:
the layout module is configured to place the termination-free unit designs;
the outline setting module is configured to set an outline around the placed termination-free unit designs; and
the termination generation module is configured to generate a termination within the border.

8. The semiconductor design system of claim 1, wherein a termination-free unit design is stored in the memory or in another separate memory.

9. The semiconductor design system of claim 1, wherein a termination-free unit design includes an inverter design, and
a combined termination-free unit design includes a logic block design.

10. The semiconductor design system of claim 1, wherein a termination-free unit design includes a memory cell design, and
a combined termination-free unit design includes a memory cell array design.

* * * * *